(12) United States Patent
Yun et al.

(10) Patent No.: US 8,737,448 B2
(45) Date of Patent: May 27, 2014

(54) APPARATUS AND METHOD FOR PROVIDING FREQUENCY HOPPING SCHEME IN BROADCAST COMMUNICATION SYSTEM

(75) Inventors: Sung-Ryul Yun, Gyeonggi-do (KR); Hong-Sil Jeong, Seoul (KR); Hyun-Koo Yang, Seoul (KR)

(73) Assignee: Samsung Electronics Co., Ltd (KR)

( * ) Notice: Subject to any disclaimer, the term of this patent is extended or adjusted under 35 U.S.C. 154(b) by 172 days.

(21) Appl. No.: 13/407,244

(22) Filed: Feb. 28, 2012

(65) Prior Publication Data

US 2012/0224608 A1  Sep. 6, 2012

(30) Foreign Application Priority Data

Mar. 3, 2011  (KR) .................. 10-2011-0018731

(51) Int. Cl.
*H04B 1/00* (2006.01)

(52) U.S. Cl.
USPC ............ 375/135; 375/130; 375/136; 375/132

(58) Field of Classification Search
CPC .... H04L 5/0012; H04B 1/7143; H04B 1/713; H04B 7/2125
USPC .................... 375/135, 130, 136, 132
See application file for complete search history.

(56) References Cited

U.S. PATENT DOCUMENTS

| | | | | |
|---|---|---|---|---|
| 5,123,029 A * | 6/1992 | Bantz et al. | .................. | 375/133 |
| 5,442,659 A * | 8/1995 | Bauchot et al. | ............... | 375/134 |
| 6,567,383 B1 * | 5/2003 | Bohnke | ........................ | 370/280 |
| 7,738,529 B2 * | 6/2010 | Horiguchi | ..................... | 375/133 |
| 2007/0248037 A1 * | 10/2007 | Stewart et al. | ................ | 370/328 |
| 2008/0043613 A1 * | 2/2008 | Yang et al. | ..................... | 370/208 |
| 2008/0205487 A1 * | 8/2008 | Hu et al. | ........................ | 375/132 |
| 2010/0110994 A1 * | 5/2010 | Ratsuk et al. | ................. | 370/329 |
| 2010/0158078 A1 * | 6/2010 | Ro et al. | ........................ | 375/135 |
| 2010/0226331 A1 * | 9/2010 | Lim et al. | ...................... | 370/329 |
| 2011/0026471 A1 * | 2/2011 | Miki et al. | ..................... | 370/329 |

FOREIGN PATENT DOCUMENTS

| | | |
|---|---|---|
| KR | 1020070030561 | 3/2007 |
| KR | 1020100073752 | 7/2010 |
| WO | WO 2007/124227 | 11/2007 |

* cited by examiner

*Primary Examiner* — Kenneth Lam
(74) *Attorney, Agent, or Firm* — The Farrell Law Firm, P.C.

(57) ABSTRACT

An apparatus and a method for using a frequency hopping scheme in a broadcast communication system are provided. A method for transmitting a broadcast signal via at least two frequency bands by a transmission end device in the broadcast communication system includes determining a frequency hopping pattern for providing a broadcast service and transmitting the same; transmitting control information via a first frame after a frequency is changed according to the frequency hopping pattern; and transmitting broadcast data for the broadcast service via a frame transmitted after the first frame.

14 Claims, 7 Drawing Sheets

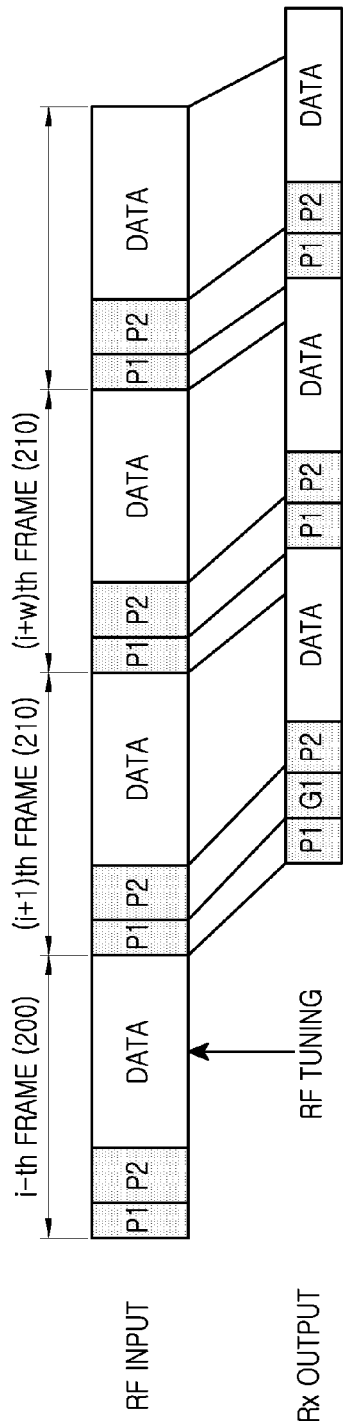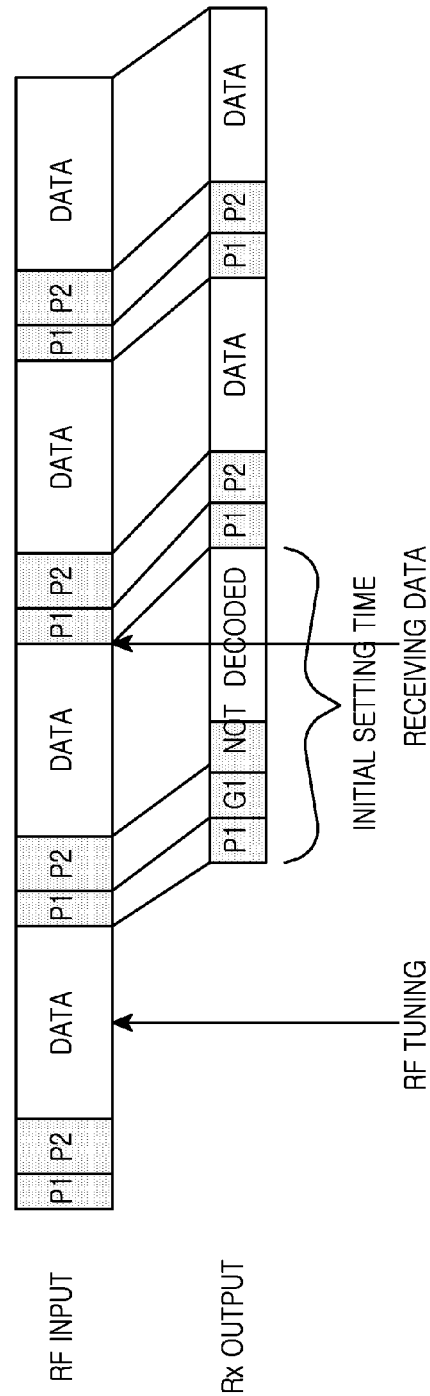
FIG.2A (PRIOR ART)
FIG.2B (PRIOR ART)

APPARATUS AND METHOD FOR PROVIDING FREQUENCY HOPPING SCHEME IN BROADCAST COMMUNICATION SYSTEM

PRIORITY

This application claims priority under 35 U.S.C. §119(a) to a Korean patent application filed in the Korean Intellectual Property Office on Mar. 3, 2011 and assigned Serial No. 10-2011-0018731, the entire content of which is incorporated herein by reference.

BACKGROUND OF THE INVENTION

1. Field of the Invention

The present invention relates generally to a broadcast communication system, and more particularly, to an apparatus and method for providing a frequency hopping scheme in a broadcast communication system.

2. Description of the Related Art

A broadcast communication system may use a frequency hopping scheme in order to prevent a deterioration in broadcast quality resulting from errors of a broadcast channel. For example, a broadcast communication system may provide a Time Frequency Slicing (TFS) scheme as illustrated in FIG. 1.

FIG. 1 illustrates a conventional frequency hopping pattern of a broadcast communication system.

Referring to FIG. 1, a broadcast communication system supports a first Radio Frequency (RF1) 100, a second Radio Frequency (RF2) 110, a third Radio Frequency (RF3) 120, and a fourth Radio Frequency (RF4) 130.

When a transmission end provides a broadcast service, the transmission end transmits a first broadcast signal 102 corresponding to the broadcast service via the RF1 100. After transmission of the first broadcast signal 102, the transmission end transmits a second broadcast signal 112 corresponding to the broadcast service via the RF2 110 according to a frequency hopping pattern. After the second broadcast signal 112 is transmitted, the transmission end determines an interval between a frame that transmits the first broadcast signal 102 and a frame that transmits the second broadcast signal 112 in consideration of an RF tuning time 104 of a reception end that receives the broadcast service.

When the reception end receives the broadcast service from the transmission end, the reception end receives the first broadcast signal 102 via the RF1 100. After the reception end receives the first broadcast signal 102, the reception end changes a frequency to the RF2 110 according to the frequency hopping pattern provided from the transmission end to receive the second broadcast signal 112 via the RF2 110.

As described above, the transmission end transmits a broadcast signal in consideration of the RF tuning time 104 of the reception end so that the reception end may receive a broadcast signal according to a TFS scheme. However, when a frame configured according to a Digital Video Broadcasting for a Second Generation Terrestrial (DVB-T2) system, a reception end may not receive a TFS frame due to a signal delay, such as illustrated in FIGS. 2A and 2B.

FIGS. 2A and 2B are diagrams illustrating a conventional construction for receiving a broadcast signal at a reception end of a broadcast communication system.

FIG. 2A illustrates a construction that cannot receive broadcast data due to a signal delay, and FIG. 2B illustrates a construction for receiving broadcast data with consideration of a signal delay.

As illustrated in FIG. 2A, when a frequency via which a reception end is to receive a broadcast service changes according to a frequency hopping pattern, the reception end performs RF tuning at an i-th frame 200.

After RF tuning is performed, the reception end changes a frequency and receives a broadcast signal via a first received (i+1)-th frame 210. For example, when using a DVB-T2 frame, the reception end obtains frame synchronization via a first preamble symbol P1 positioned at the start portion of a frame, and determines Fast Fourier Transform (FFT) size information of the system in signaling information of the P1 symbol. After determining the FFT size information, the reception end determines an FFT size for decoding a second preamble symbol P2 using the determined FFT size information, and obtains Guard Interval (GI) information via correlation or windowing of a received signal. After the GI information is obtained, the reception end may receive a GI and perform frequency fine tuning, etc. based on the P2 symbol and depending on the FFT size and GI information, and may then receive system configuration information (i.e., physical layer information) of the P2 symbol.

When broadcast data is received as described above, a delay may occur at the (i+1)-th frame 210 due to estimation of a GI of a P2 symbol and frequency fine tuning, so that the reception end may not decode a signal of an (i+2)-th frame.

Accordingly, as illustrated in FIG. 2B, the reception end changes a frequency, and then performs only an initial setting for receiving broadcast data via a first received (i+1)-th frame 210. For example, the reception end obtains synchronization during the (i+1)-th frame 210, determines an FFT size for decoding a P2 symbol, and obtains GI information. At this point, the reception end does not decode a P2 symbol of a broadcast signal and broadcast data received via the (i+1)-th frame 210.

After obtaining the GI information, the reception end decodes the P2 symbol and the broadcast data from an (i+2)-th frame 220 using the initial setting information determined via the (i+1)-th frame 210.

As described above, when changing a frequency of the reception end according to the frequency hopping pattern, the reception end cannot decode a P2 symbol of a first frame received via the changed frequency due to a signal delay and a processing delay. Accordingly, when a frequency changes, the reception end can receive broadcast data from a second frame.

When the broadcast communication system applies a TFS technique, the reception end cannot receive broadcast data transmitted via the first frame of the changed frequency.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for providing a frequency hopping scheme in a broadcast communication system.

Another aspect of the present invention is to provide an apparatus and a method for reducing a resource waste by a frequency hopping scheme in a broadcast communication system.

Still another aspect of the present invention is to provide an apparatus and a method for reducing a broadcast data loss by a frequency hopping scheme in a broadcast communication system.

Yet another aspect of the present invention is to provide an apparatus and a method for scheduling a broadcast service according to a frequency hopping pattern at a transmission end of a broadcast communication system.

Still yet another aspect of the present invention is to provide an apparatus and a method for switching to an idle mode depending on a frequency hopping pattern at a reception end of a broadcast communication system.

In accordance with an aspect of the present invention, a method for transmitting a broadcast signal via at least two frequency bands by a transmission end device in a broadcast communication system is provided. The method includes determining a frequency hopping pattern for providing a broadcast service and transmitting the same, transmitting control information via a first frame after a frequency is changed according to the frequency hopping pattern, and transmitting broadcast data for the broadcast service via a frame transmitted after the first frame.

In accordance with another aspect of the present invention, a method for receiving a broadcast signal via at least two frequency bands by a reception end device in a broadcast communication system is provided. The method includes determining a frequency hopping pattern according to information received from a transmission end, when a frequency via which a broadcast service is provided changes according to the frequency hopping pattern, determining control information via a first frame of the changed frequency, and detecting broadcast data via a frame received after the first frame of the changed frequency according to the control information and the frequency hopping pattern.

In accordance with still another aspect of the present invention, an apparatus for transmitting a broadcast signal via at least two frequency bands at a transmission end in a broadcast communication system is provided. The apparatus includes a frequency hopping controller for determining a frequency hopping pattern for providing a broadcast service, a scheduler for scheduling transmission of control information required for allowing a reception end to receive broadcast data regarding the broadcast service via a first frame after a frequency has changed according to the frequency hopping pattern, and transmission of the broadcast data for the broadcast service via a frame positioned after the first frame, and a transmitter for transmitting the frequency hopping pattern, control information, and the broadcast data.

In accordance with still yet another aspect of the present invention, an apparatus for receiving a broadcast signal via at least two frequency bands at a reception end in a broadcast communication system is provided. The apparatus includes a frequency hopping controller for determining a frequency hopping pattern provided from a transmission end, a Radio Frequency (RF) receiver for tuning a frequency for receiving a broadcast signal under a control of the frequency hopping controller to receive a broadcast signal, and a receiver for, when a frequency via which a broadcast service is provided changes according to the frequency hopping pattern, receiving control information for receiving broadcast data via a first frame of the changed frequency, and detecting the broadcast data from a frame existing after the first frame of the changed frequency according to the control information.

BRIEF DESCRIPTION OF THE DRAWINGS

The above and other aspects, features and advantages of certain embodiments of the present invention will be more apparent from the following description taken in conjunction with the accompanying drawings in which:

FIGS. 2A and 2B are diagrams illustrating a construction for receiving a broadcast signal at a reception end of a broadcast communication system according to the conventional art;

Throughout the drawings, like reference numerals will be understood to refer to like parts, components and structures.

DETAILED DESCRIPTION OF EMBODIMENTS
OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

Embodiments of the present invention provide a technology for providing a frequency hopping scheme in a broadcast communication system.

In the following description, it is assumed that the broadcast communication system provides a Time Frequency Slicing (TFS) scheme.

Figure 1:
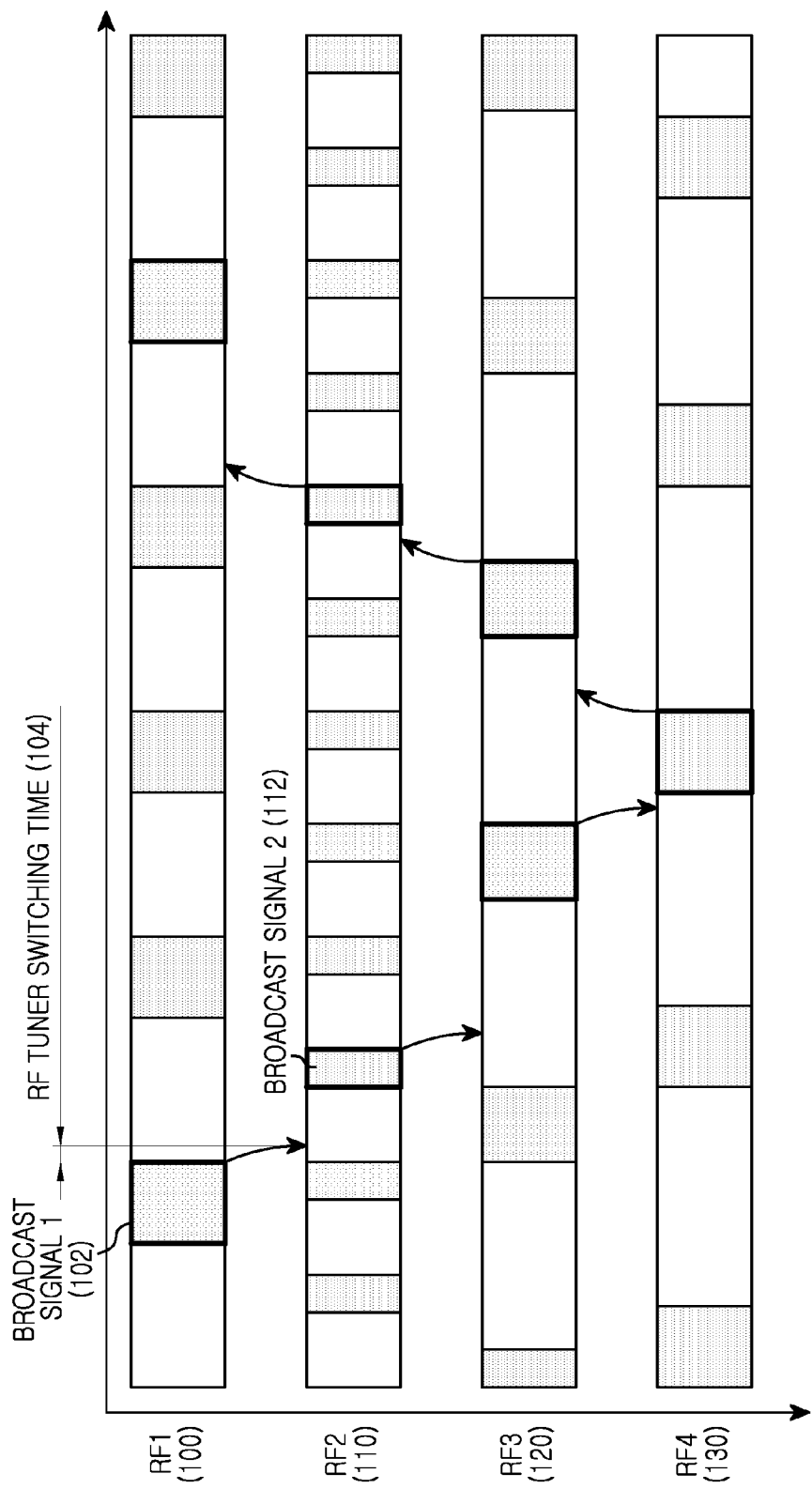
FIG. 1 is a diagram illustrating a frequency hopping pattern of a broadcast communication system according to the conventional art.
Figure 3:
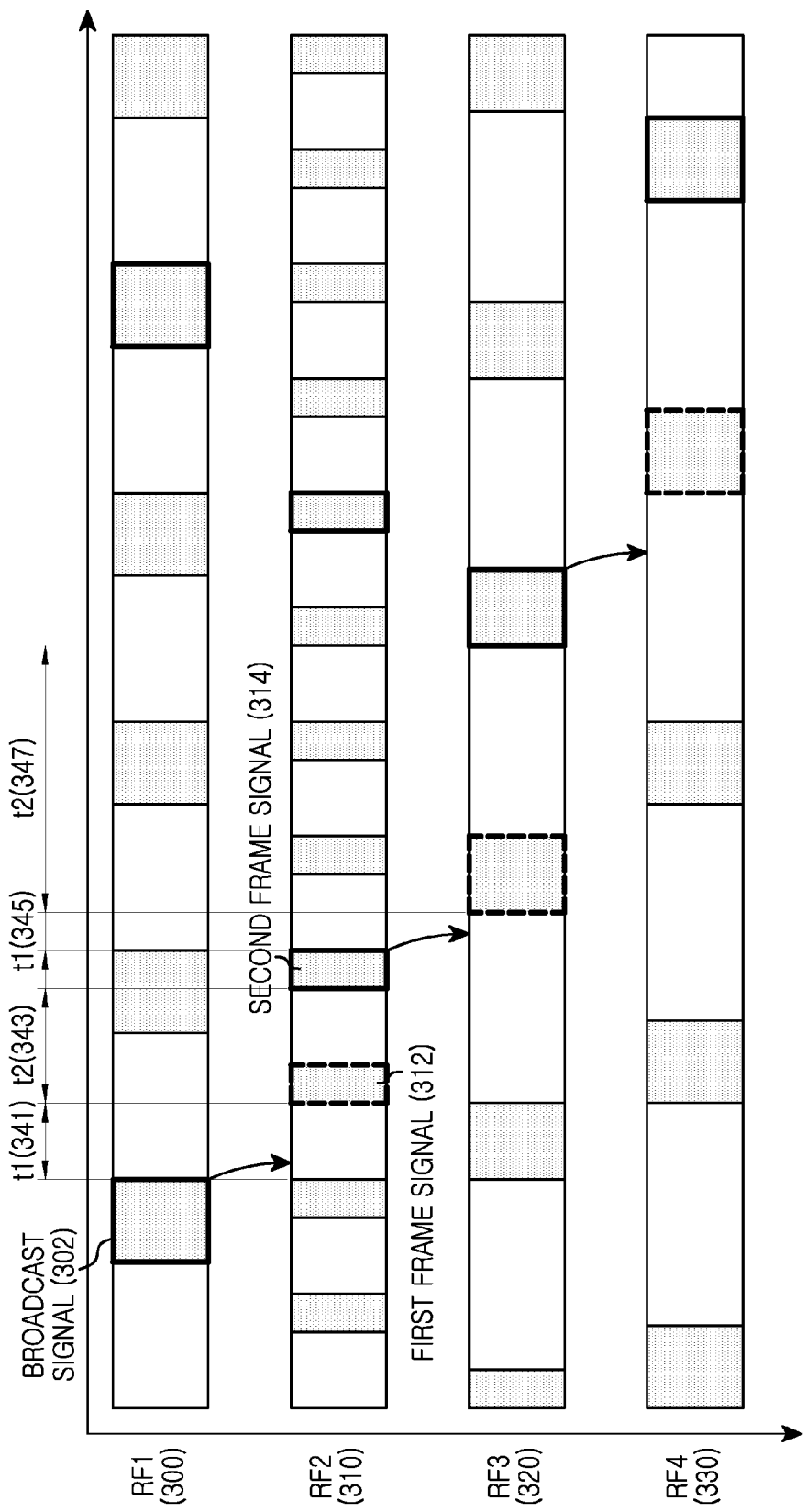
FIG. 3 is a diagram illustrating a frequency hopping pattern in a broadcast communication system according to an embodiment of the present invention.

FIG. 3 illustrates a frequency hopping pattern in a broadcast communication system according to an embodiment of the present invention.

According to the example illustrated in FIG. 3, the broadcast communication system supports a first Radio Frequency (RF1) 300, a second Radio Frequency (RF2) 310, a third Radio Frequency (RF3) 320, and a fourth Radio Frequency (RF4) 330.

In the case where a transmission end provides a broadcast service, the transmission end transmits a first broadcast signal 302 corresponding to a specific broadcast service via the RF1 300. After the first broadcast signal 302 is transmitted, the transmission end transmits a broadcast signal corresponding to the broadcast service via the RF2 310 according to a frequency hopping pattern.

When the frequency that provides the broadcast service changes as described above, the transmission end recognizes that a reception end changes the frequency to the RF2 310 and then cannot receive broadcast data via a first frame 312. More specifically, the transmission end recognizes that the reception end cannot receive broadcast data via the first frame 312 that arrives after a first time period t1 (341). Accordingly, the transmission end schedules transmission of broadcast data via a second frame 314 of the RF2 310. For example, when the transmission end provides a broadcast service regarding a first channel to the reception end, the transmission end transmits i-th broadcast data regarding the broadcast service via the RF1 300. After transmission of the i-th broadcast data, the transmission end transmits (i+1)-th broadcast data regarding the broadcast service via a frame 314 that arrives after time t1 (341) and a second time period t2 (343), but not via the first frame 312. At this point, the transmission end may transmit a broadcast signal corresponding to a different broadcast service or an arbitrary signal during the first frame 312. Herein, i represents a broadcast data index.

When a reception end receives the broadcast service from the transmission end, the reception end receives a first broadcast signal 302 via the RF1 300. After that, the reception end changes a frequency to RF2 310 according to a frequency hopping pattern provided from the transmission end. At this point, the reception end performs an initial setting for receiving broadcast data during the first frame 312 of the RF2 310. For example, the reception end determines an FFT size in a P1 symbol of a signal received via the first frame 312, and estimates a GI in the P2 symbol. At this point, the reception end may recognize the first frame 312 depending on time information corresponding to t1 341 provided from the transmission end.

The reception end receives a broadcast signal via a second frame 314 according to the initial setting performed via the first frame 312. More specifically, the reception end receives a broadcast signal via the second frame 314 according to the time information corresponding to t2 343 provided from the transmission end. At this point, the reception end performs an initial setting via the first frame 312 with consideration of time t1 (341) and time t2 (343), and then may operate in an idle mode until the second frame 314 arrives.

Figure 4:
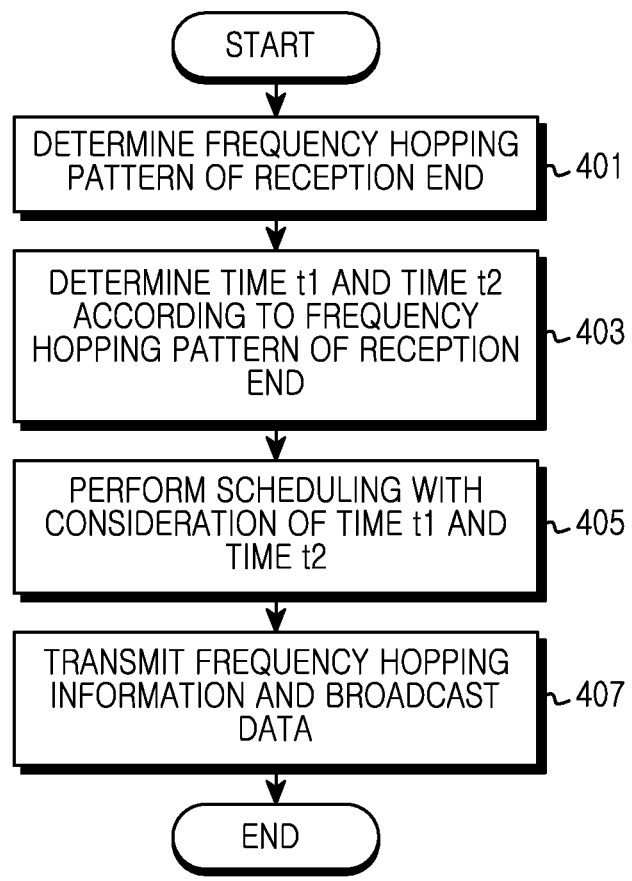
FIG. 4 is a flowchart illustrating a procedure for transmitting a broadcast signal at a transmission end in a broadcast communication system according to an embodiment of the present invention.

FIG. 4 is a flowchart illustrating a procedure for transmitting a broadcast signal at a transmission end in a broadcast communication system according to an embodiment of the present invention.

Referring to FIGS. 3 and 4, the transmission end determines a frequency hopping pattern for a TFS scheme, in step 401.

In step 403, the transmission end determines time t1 (341) and time t2 (343) according to the frequency hopping pattern. Here, time t1 (341) denotes a time from a point at which a broadcast signal has been transmitted last via a frequency before a change to a first frame after the frequency has changed. Time t2 (343) denotes a time from a first frame after a frequency band has changed to a second frame.

After determining time t1 (341) and time t2 (343), the transmission end schedules a broadcast service with consideration of time t1 (341) and time t2 (343), in step 405. For example, when using the frequency hopping pattern of FIG. 3, the transmission end recognizes that a reception end cannot receive broadcast data via a first frame 312 after the reception end changes a frequency to the RF2 310. In other words, the transmission end recognizes that the reception end cannot receive broadcast data via the first frame 312 that arrives after time t1 (341) after the broadcast signal 302 is transmitted via the RF1 300. Accordingly, the transmission end schedules transmission of broadcast data via the second frame 314 of the RF2 310.

In step 407, the transmission end transmits broadcast data according to the frequency hopping pattern and the scheduling information. The transmission end also transmits the frequency hopping pattern determined in step 401. For example, the transmission end transmits the frequency hopping pattern using a P2 symbol. Alternatively, the transmission end may transmit the frequency hopping pattern using a separate control signal. Here, the frequency hopping pattern includes frequency information via which a broadcast service is provided, a frequency change point, time t1 (341) and time t2 (343).

Figure 5:
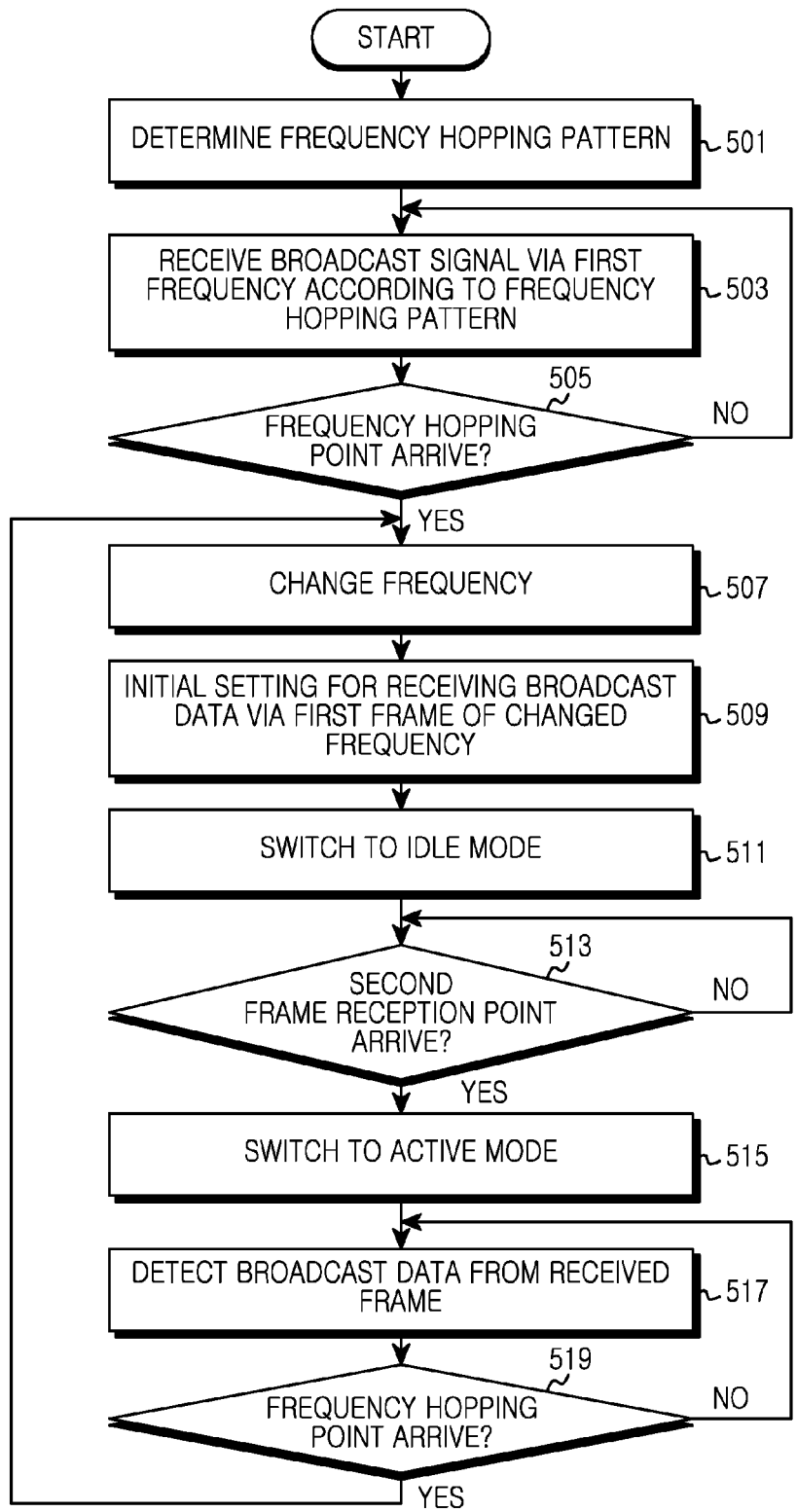
FIG. 5 is a flowchart illustrating a procedure for receiving a broadcast signal at a reception end in a broadcast communication system according to an embodiment of the present invention.

FIG. 5 is a flowchart illustrating a procedure for receiving a broadcast signal at a reception end in a broadcast communication system according to an embodiment of the present invention.

Referring to FIGS. 3 and 5, the reception end determines a frequency hopping pattern provided from a transmission end, in step 501. The frequency hopping pattern includes frequency information via which a broadcast service is provided, time t1 (341), and time t2 (343).

After determining the frequency hopping pattern, the reception end receives a broadcast signal via a first frequency according to the frequency hopping pattern, in step 503. For example, in case of FIG. 3, the reception end receives a broadcast signal via the RF1 300.

After receiving the broadcast signal via the first hopping pattern, the reception end determines whether a frequency hopping point arrives according to the frequency hopping pattern, in step 505.

If the frequency hopping point does not arrive, the reception end returns to step 503 to receive a broadcast signal via the first frequency.

However, when the frequency hopping point arrives in step 505, the reception end changes a frequency via which the broadcast service is to be provided according to the frequency hopping pattern, in step 507. For example, in the example of FIG. 3, the reception end changes a serving frequency to RF2 310 according to the frequency hopping pattern.

After changing the serving frequency via which the broadcast service is to be provided, the reception end performs an initial setting for receiving broadcast data during a first frame of the serving frequency changed according to time t1 (341), in step 509. For example, in the example of FIG. 3, the reception end obtains frame synchronization via a P1 symbol of a signal received via the first frame 312 of RF2 310, and determines FFT size information of the system in signaling information of the P1 symbol. After that, the reception end determines the FFT size for decoding the P2 symbol using the FFT size information. The reception end also obtains GI information via correlation or windowing of a received signal.

After performing the initial setting via the first frame, the reception end switches to an idle mode, in step 511.

After switching to the idle mode, the reception end determines whether a reception point of a second frame arrives according to time t2 (343), in step 513.

When the reception point of the second frame does not arrive, the reception end continuously determines whether the reception point of the second frame arrives in the idle mode. For example, the reception end, while operating in the idle mode, may be activated according to a regular time interval to determine whether the reception point arrives. For another example, when time t2 (343) arrives, the reception end may recognize that t2 is the reception point to automatically switch from the idle mode to an active mode.

In contrast, when the reception point of the second frame arrives, the reception end switches to the active mode, in step 515.

After switching to the active mode, in step 517, the reception end detects broadcast data using the initial setting information performed in step 509.

In step 519, the reception end determines whether a frequency hopping point arrives according to the frequency hopping pattern.

If the frequency hopping point arrives, the reception end returns to step 507 to change a serving frequency via which the broadcast service is to be provided according to the frequency hopping pattern.

However, if the frequency hopping point does not arrive, the reception end returns to step 517 to detect broadcast data from a received frame.

In the above-described embodiment of the present invention, after changing the frequency, the reception end performs initial setting via the first frame, and operates in the idle mode until a second frame is received, in step 511.

According to another embodiment of the present invention, the reception end may change the frequency, and then perform an initial setting via the first frame, and maintain an active mode until the second frame is received. In this case, the reception end omits steps 511 and 515 of FIG. 5.

A construction of a transmission end for providing a broadcast service according to the TFS scheme according to an embodiment of the present invention is described as follows with reference to FIG. 6.

Figure 6:
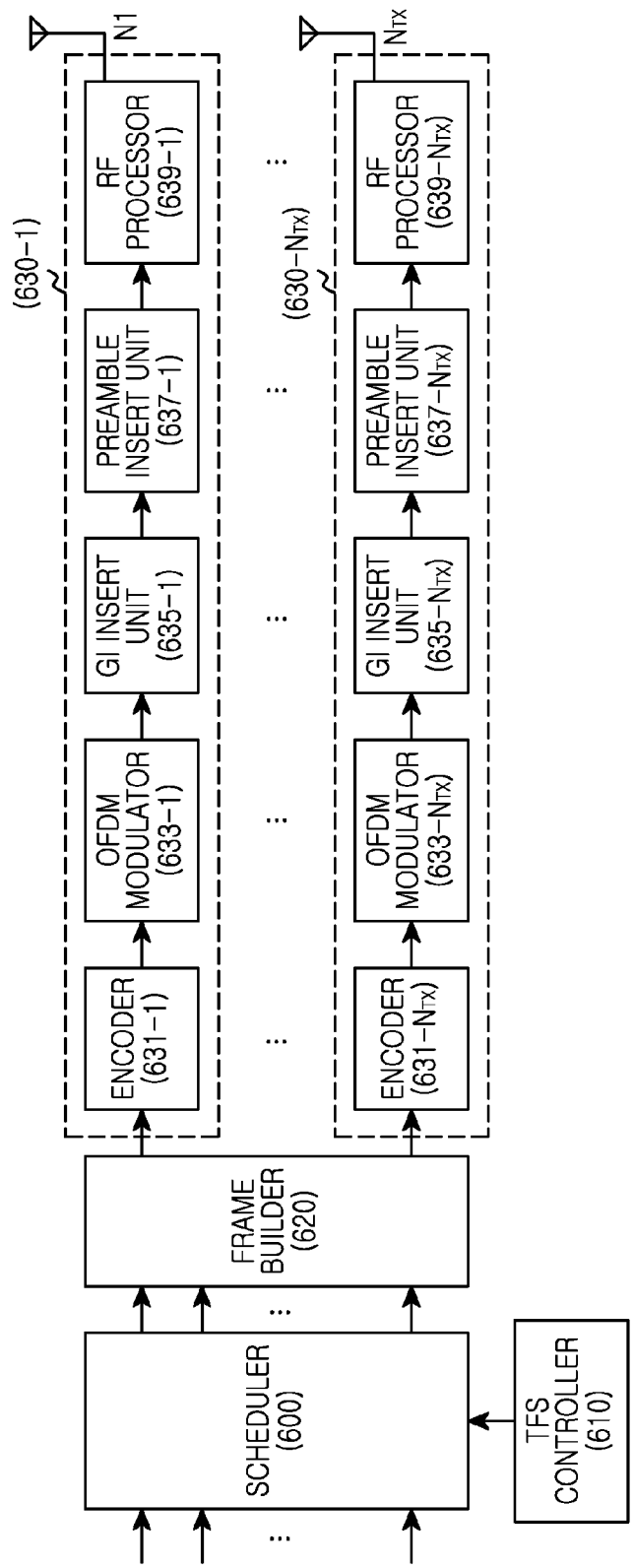
FIG. 6 is a block diagram illustrating a construction of a transmission end in a broadcast communication system according to an embodiment of the present invention.

FIG. 6 is a block diagram illustrating a construction of a transmission end in a broadcast communication system according to an embodiment of the present invention.

Referring FIG. 6, the transmission end includes a scheduler 600, a TFS controller 610, a frame builder 620, and a plurality of transmitters 630-1 to 630-$N_{TX}$.

The scheduler 600 schedules broadcast services according to a frequency hopping pattern provided from the TFS controller 610. For example, when using the frequency hopping pattern of FIG. 3, the scheduler 600 transmits the broadcast signal 1 302 via the RF1 300, and then recognizes that a reception end cannot receive broadcast data via the first frame 312 that arrives after time t1 (341). Accordingly, the scheduler 600 schedules transmission of broadcast data via the second frame 314 of the RF2 310.

The TFS controller 610 determines a frequency hopping pattern for the TFS scheme.

The frame builder 620 maps broadcast data to transmit via each frequency band to relevant transmitters 630-1 to 630-$N_{TX}$ according to the frequency hopping pattern determined by the TFS controller 610.

The transmitters 630-1 to 630-$N_{TX}$ configure a broadcast signal to transmit via each frequency. When the broadcast signal is configured, the detailed block configurations of the transmitters 630-1 to 630-$N_{TX}$ are the same. Accordingly, the first transmitter 630-1 of the transmitters 630-1 to 630-$N_{TX}$ is described as representative examples of all of the transmitters.

The first transmitter 630-1 includes an encoder 631-1, an Orthogonal Frequency Division Multiplexing (OFDM) modulator 633-1, a GI insert unit 635-1, a preamble insert unit 637-1, and an RF processor 639-1.

The encoder 631-1 channel-encodes and modulates broadcast data to transmit via a relevant frequency to generate data symbols.

The OFDM modulator 633-1 performs Inverse Fast Fourier Transform (IFFT) on the data symbol provided from the encoder 631-1.

The GI insert unit 635-1 inserts a GI into a time domain signal provided from the OFDM modulator 633-1.

The preamble insert unit 637-1 inserts a preamble signal (P1 symbol) into a front end of a signal provided from the GI insert unit 635-1.

The RF processor 639-1 up-converts a signal provided from the preamble insert unit 637-1 to an RF signal and transmits the up-converted signal via an antenna. For example, the RF processor 639-1 may include an amplifier, a mixer, an oscillator, and a Digital to Analog Converter (DAC) (not shown).

The plurality of transmitters 630-1 to 630-$N_{TX}$ included in the transmission end is used for transmitting a signal via each frequency.

As an alternative, according to another embodiment of the present invention, the transmission end may include only one transmitter for processing a broadband signal. For example, the transmission end may sequentially process data output from the frame builder 620 using only the first transmitter 630-1. In this case, the RF processor 639-1 processes a plurality of RF bands under control of the TFS controller 610.

According to another embodiment of the present invention, the transmission end may include only one transmitter including a plurality of RF processors. For example, the transmission end may sequentially process data output from the frame builder 620 using only the first transmitter 630-1 including the encoder 631-1, the OFDM modulator 633-1, the GI insert unit 635-1, the preamble insert unit 637-1, and the plurality of RF processors 639-1. In this case, though not shown, a switch for connecting the preamble insert unit 637-1 with a relevant RF processor may be positioned between the preamble insert unit 637-1 and the plurality of RF processors according to a frequency hopping pattern.

A construction of a reception end for receiving a broadcast signal according to an embodiment of the present invention is described as follows with reference to FIG. 7.

Figure 7:
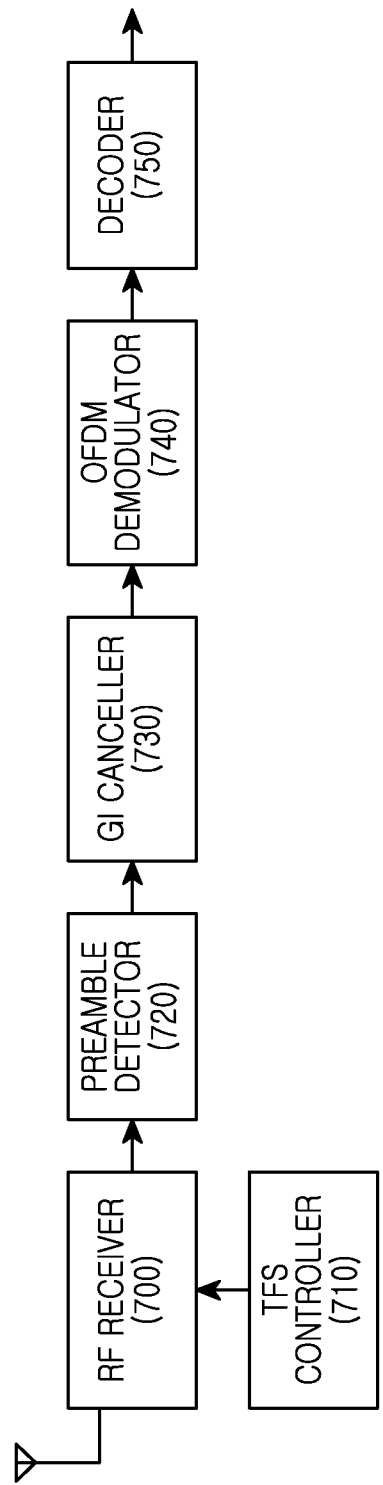
FIG. 7 is a block diagram illustrating a construction of a reception end in a broadcast communication system according to an embodiment of the present invention.

FIG. 7 is a block diagram illustrating a construction of a reception end in a broadcast communication system according to an embodiment of the present invention.

Referring to FIG. 7, the reception end includes an RF receiver 700, a TFS controller 710, a preamble detector 720, a GI canceller 730, an OFDM demodulator 740, and a decoder 750.

The RF receiver 700 down-converts an RF signal received via an antenna to a baseband signal. In performing this down-conversion, the RF receiver 700 receives a signal of a frequency band via which the reception end desires to receive a broadcast service under control of the TFS controller 710. For example, the RF receiver 700 may include an amplifier, a mixer, an oscillator, and an Analog to Digital Converter (not shown).

The TFS controller 710 controls a serving frequency via which the RF receiver 700 is intended to receive a broadcast service according to the frequency hopping pattern provided from the transmission end.

The preamble detector 720 detects a preamble signal (i.e., a P1 symbol) from a signal provided from the RF receiver 700 to obtain frame synchronization. In addition, when a serving frequency for receiving a broadcast service changes due to a frequency hopping pattern, the preamble detector 720 changes the serving frequency and then performs an initial setting for receiving broadcast data during a first frame. For example, the preamble detector 720 obtains frame synchronization via a P1 symbol of the first frame, and determines FFT size information of the system in signaling information of the P1 symbol. After determining the FFT size information of the system, the preamble detector 720 determines a FFT size for decoding a P2 symbol using the FFT size information. In addition, the preamble detector 720 obtains GI information via correlation or windowing of a received signal.

The GI canceller 730 cancels a GI from a received signal.

The OFDM demodulator 740 recovers a symbol mapped to a frequency domain by performing Fast Fourier Transform (FFT) on symbols whose GI has been canceled by the GI canceller 730.

The decoder 750 compensates for distortion of a data symbol provided from the OFDM demodulator 740, and demodulates and channel-decodes the data symbol to recover packets including broadcast data. For example, when a serving frequency for receiving a broadcast service changes due to a frequency hopping pattern, the decoder 750 changes the serving frequency, and then decodes a broadcast signal received via a second frame to recover packets including broadcast data.

Although not shown, the reception end further includes a controller for controlling an overall operation of the reception end. The controller controls the reception end to operate in an idle mode according to the frequency hopping pattern provided from a transmission end. For example, the reception end performs initial setting for receiving a broadcast signal via a frame received first after changing a frequency. The controller performs initial setting via a first frame according to time t1 (341) and time t2 provided from the transmission end, and then controls the reception end to operate in the idle mode until a second frame arrives.

As described above, the transmission end of the broadcast communication system, which uses a frequency hopping scheme, schedules a broadcast service according to the frequency hopping pattern of the reception end, so that the reception end may prevent broadcast data from being lost due to the frequency hopping.

In addition, the reception end operates in the idle mode according to the frequency hopping pattern, so that power consumption of the reception end may be reduced.

Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention is not be limited to the above-described embodiments but is be determined according to the appended claims and any equivalents thereof.

What is claimed is:

1. A method for transmitting a broadcast signal via at least two frequency bands by a transmission end device in a broadcast communication system, the method comprising:
   determining a frequency hopping pattern for providing a broadcast service;
   transmitting the determined frequency hopping pattern;
   transmitting control information via a first frame after a frequency is changed according to the frequency hopping pattern; and
   transmitting broadcast data for the broadcast service via a frame transmitted after the first frame,
   wherein the frequency hopping pattern includes at least one of frequency information via which the broadcast service is provided, a frequency change point, a time interval from a point at which a broadcast signal has been transmitted last before frequency change to a first frame after the frequency change, and a time interval from the first frame to a second frame.

2. The method of claim 1, wherein transmitting the determined frequency hopping pattern comprises
   transmitting the determined frequency hopping pattern using a second preamble (P2) symbol of a broadcast signal.

3. A method for receiving a broadcast signal via at least two frequency bands by a reception end device in a broadcast communication system, the method comprising:
   determining a frequency hopping pattern according to information received from a transmission end;
   when a frequency via which a broadcast service is provided changes according to the frequency hopping pattern, determining control information via a first frame of the changed frequency; and
   detecting broadcast data via a frame received after the first frame of the changed frequency according to the control information and the frequency hopping pattern,
   wherein the frequency hopping pattern includes at least one of frequency information via which the broadcast service is provided, a frequency change point, a first time interval from a point at which a broadcast signal has been transmitted last before frequency change to a first frame after the frequency change, and a second time interval from the first frame to a second frame.

4. The method of claim 3, further comprising, after determining the control information, operating in an idle mode until a frame including the broadcast data is received.

5. The method of claim 4, wherein operating in the idle mode comprises:
   switching, after the determining of the control information, to the idle mode;
   switching, when the second frame arrives with consideration of a time interval from the first frame to the second frame, to an active mode; and
   detecting, after switching to the active mode, the broadcast data via a frame received after a first frame of the changed frequency according to the control information.

6. The method of claim 3, wherein determining the frequency hopping pattern comprises determining the frequency hopping pattern via a second preamble (P2) symbol of a broadcast signal.

7. The method of claim 3, wherein determining the control information comprises:
   obtaining frame synchronization via a first preamble (P1) symbol of the first frame;
   determining Fast Fourier Transform (FFT) size information of a system in signaling information of the P1 symbol;
   determining an FFT size for decoding a second preamble (P2) symbol using the FFT size information; and
   obtaining Guard Interval (GI) information via correlation or windowing of a signal received via the first frame.

8. An apparatus for transmitting a broadcast signal via at least two frequency bands at a transmission end in a broadcast communication system, the apparatus comprising:
   a frequency hopping controller for determining a frequency hopping pattern for providing a broadcast service;
   a scheduler for scheduling transmission of control information required for allowing a reception end to receive broadcast data regarding the broadcast service via a first frame after a frequency has changed according to the frequency hopping pattern, and transmission of the broadcast data for the broadcast service via a frame positioned after the first frame; and a transmitter for transmitting the determined frequency hopping pattern, control information, and the broadcast data, wherein the frequency hopping pattern includes at least one of frequency information via which the broadcast service is provided, a frequency change point, a time interval from a point at which a broadcast signal has been transmitted last before frequency change to a first frame after the frequency change, and a time interval from the first frame to a second frame.

9. The apparatus of claim 8, wherein the transmitter transmits the determined frequency hopping pattern determined by the frequency hopping controller using a second preamble (P2) symbol of a broadcast signal.

10. An apparatus for receiving a broadcast signal via at least two frequency bands at a reception end in a broadcast communication system, the apparatus comprising:

a frequency hopping controller for determining a frequency hopping pattern provided from a transmission end;

a Radio Frequency (RF) receiver for tuning a frequency for receiving a broadcast signal under a control of the frequency hopping controller to receive a broadcast signal; and a receiver for, when a frequency via which a broadcast service is provided changes according to the frequency hopping pattern, receiving control information for receiving broadcast data via a first frame of the changed frequency, and detecting the broadcast data from a frame existing after the first frame of the changed frequency according to the control information, wherein the frequency hopping pattern includes at least one of frequency information via which the broadcast service is provided, a frequency change point, a first time interval from a point at which a broadcast signal has been last transmitted before a frequency change to a first frame after the frequency change, and a second time interval from the first frame to a second frame.

11. The apparatus of claim 10, further comprising a controller for controlling operations in an idle mode until a frame including the broadcast data arrives after receiving the control information.

12. The apparatus of claim 11, wherein the controller determines the control information and then controls to switch to the idle mode, and when a second frame arrives with consideration of a time interval between the first frame and the second frame, the controller controls a switch to an active mode.

13. The apparatus of claim 10, wherein the frequency hopping controller determines the frequency hopping pattern via a second preamble (P2) symbol of a broadcast signal.

14. The apparatus of claim 10, wherein the receiver obtains frame synchronization via a first preamble (P1) symbol of the first frame, determines Fast Fourier Transform (FFT) size information of a system in signaling information of the P1 symbol, determines an FFT size for decoding a P2 symbol using the FFT size information, and obtains Guard Interval (GI) information via correlation or windowing of a signal received via the first frame.

* * * * *